(12) United States Patent
Lin

(10) Patent No.: US 10,845,677 B2
(45) Date of Patent: *Nov. 24, 2020

(54) LED FLASH RING SURROUNDING CAMERA LENS

(71) Applicant: Lumileds LLC, San Jose, CA (US)

(72) Inventor: Xueqin Lin, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,779

(22) Filed: Dec. 31, 2019

(65) Prior Publication Data

US 2020/0133094 A1 Apr. 30, 2020

Related U.S. Application Data

(63) Continuation of application No. 16/369,588, filed on Mar. 29, 2019, now Pat. No. 10,558,107, which is a (Continued)

(30) Foreign Application Priority Data

Jun. 7, 2016 (EP) ..................................... 16173241

(51) Int. Cl.
*F21V 21/00* (2006.01)
*G03B 15/05* (2006.01)
(Continued)

(52) U.S. Cl.
CPC ........... *G03B 15/05* (2013.01); *G02B 6/0036* (2013.01); *G02B 6/0051* (2013.01); (Continued)

(58) Field of Classification Search
CPC .... G03B 15/05; G03B 15/03; G03B 15/0442; G03B 15/06; G03B 2215/0567; (Continued)

(56) References Cited

U.S. PATENT DOCUMENTS

| 5,984,485 A | 11/1999 | Poli et al. |
| 8,128,247 B2 | 3/2012 | Portmann et al. |

(Continued)

FOREIGN PATENT DOCUMENTS

| CN | 101553928 | 6/2011 |
| CN | 202794796 U | 3/2013 |

(Continued)

OTHER PUBLICATIONS

"U.S. Appl. No. 15/496,892, Non Final Office Action dated Sep. 21, 2018", 14 pgs.

(Continued)

*Primary Examiner* — Laura K Tso
(74) *Attorney, Agent, or Firm* — Schwegman Lundberg & Woessner, P.A.

(57) ABSTRACT

A flash system for an electronic device includes a ring-shaped light guide having a central opening. A camera lens is positioned in or behind the opening. A first light emitting diode ("LED") is mounted on a printed circuit board ("PCB"), and the LED and PCB are encapsulated by a molded light guide of the flash system. An identical LED and PCB are encapsulated at an opposite end of the molded light guide (i.e., 180 degrees away). The back surfaces of each PCB diffusively reflects light from the LED on the other PCB. Light extraction features on the light guide surface uniformly leak out light from the LEDs. The light emission profile of the light guide has a peak axially aligned with the central opening of the light guide and rolls off to the edge of the camera's field of view.

18 Claims, 2 Drawing Sheets

Related U.S. Application Data continuation of application No. 15/496,892, filed on Apr. 25, 2017, now Pat. No. 10,288,983.

(60) Provisional application No. 62/327,628, filed on Apr. 26, 2016.

(51) Int. Cl.
| | |
|---|---|
| *F21V 8/00* | (2006.01) |
| *G03B 15/03* | (2006.01) |
| *F21K 5/06* | (2006.01) |
| *G03B 15/06* | (2006.01) |

(52) U.S. Cl.
CPC ......... *G02B 6/0068* (2013.01); *G02B 6/0073* (2013.01); *G03B 15/03* (2013.01); *G03B 15/0442* (2013.01); *G03B 15/06* (2013.01); *G03B 2215/0567* (2013.01); *G03B 2215/0571* (2013.01); *G03B 2215/0575* (2013.01); *G03B 2215/0582* (2013.01); *G03B 2215/0589* (2013.01)

(58) Field of Classification Search
CPC .... G03B 2215/0571; G03B 2215/0575; G03B 2215/0582; G03B 2215/0589; G02B 6/0036; G02B 6/0051; G02B 6/0058; G02B 6/0073
USPC .................. 362/617, 612, 613, 545, 249.02
See application file for complete search history.

(56) References Cited

U.S. PATENT DOCUMENTS

| | | | |
|---|---|---|---|
| 8,515,274 | B2 | 8/2013 | Daijo |
| 8,882,323 | B2 | 11/2014 | Solomon et al. |
| 8,931,945 | B2 | 1/2015 | Yamagami |
| 10,288,983 | B2 * | 5/2019 | Lin .................. G02B 6/0068 |
| 10,288,986 | B2 | 5/2019 | Blake, III et al. |
| 10,558,107 | B2 * | 2/2020 | Lin .................. G03B 15/06 |
| 2006/0209417 | A1 | 9/2006 | Kojima |
| 2006/0209561 | A1 | 9/2006 | Tenmyo |
| 2008/0296792 | A1 * | 12/2008 | Gourlay .............. G02B 6/0021 264/1.24 |
| 2009/0238527 | A1 | 9/2009 | Zyka |
| 2011/0123184 | A1 | 5/2011 | Mather et al. |
| 2011/0316006 | A1 * | 12/2011 | Xu .................. H01L 25/0753 257/88 |
| 2012/0154672 | A1 | 6/2012 | Yamazaki et al. |
| 2013/0121677 | A1 | 5/2013 | Yeh et al. |
| 2014/0328082 | A1 | 11/2014 | Gourlay |
| 2015/0168807 | A1 | 6/2015 | Chao |
| 2017/0307962 | A1 | 10/2017 | Lin |
| 2019/0265576 | A1 | 8/2019 | Lin |

FOREIGN PATENT DOCUMENTS

| | | |
|---|---|---|
| CN | 103369083 A | 10/2013 |
| CN | 203894516 U | 10/2014 |
| EP | 2541880 A1 | 1/2013 |
| EP | 3449180 A1 | 3/2019 |
| JP | 2006236974 | 9/2006 |
| JP | 2011118383 | 6/2011 |
| JP | 2019519803 A | 7/2019 |
| TW | 200824161 | 6/2008 |
| TW | 201804236 A | 2/2018 |
| WO | WO-2007082497 A1 | 7/2007 |
| WO | WO-2017189653 A1 | 11/2017 |

OTHER PUBLICATIONS

"U.S. Appl. No. 15/496,892, Notice of Allowance dated Jan. 10, 2019", 7 pgs.

"U.S. Appl. No. 15/496,892, Response filed Dec. 14, 2018 to Non Final Office Action dated Sep. 21, 2018", 13 pgs.

"U.S. Appl. No. 16/369,588, Non Final Office Action dated May 30, 2019", 15 pgs.

"U.S. Appl. No. 16/369,588, Notice of Allowance dated Oct. 1, 2019", 5 pgs.

"U.S. Appl. No. 16/369,588, Preliminary Amendment filed May 15, 2019", 7 pgs.

"U.S. Appl. No. 16/369,588, Response filed Aug. 30, 2019 to Non-Final Office Action dated May 30, 2019", 7 pgs.

"European Application Serial No. 17723813.6, Office Action dated Apr. 3, 2020", 7 pgs.

"European Application Serial No. 16173241.7, European Search Report dated Sep. 7, 2016", 2 pgs.

"International Application Serial No. PCT/US2017/029522, International Preliminary Report on Patentability dated Nov. 8, 2018", 10 pgs.

"International Application Serial No. PCT/US2017/029522, International Search Report dated Jun. 23, 2017", 4 pgs.

"International Application Serial No. PCT/US2017/029522, Written Opinion dated Jun. 23, 2017", 8 pgs.

"Japanese Application Serial No. 2018-555901, Amendment filed Dec. 27, 2018", 8 pgs.

"Japanese Application Serial No. 2018-555901, Notification of Reasons for Refusal dated Jul. 7, 2020", (w/ English Translation), 9 pgs.

"Korean Application Serial No. 1020187034028, Notice of Preliminary Rejection dated Aug. 11, 2020", (w/ English Translation), 11 pgs.

"Taiwanese Application Serial No. 106113995, Office Action dated Jun. 8, 2020", (w/ English Translation), 7 pgs.

\* cited by examiner

LED FLASH RING SURROUNDING CAMERA LENS

CROSS REFERENCE TO RELATED APPLICATION(S)

This application is a continuation of U.S. patent application Ser. No. 15/496,892, filed Apr. 25, 2017, which claims the benefit of U.S. Provisional Application No. 62/327,628 filed on Apr. 26, 2016, the content of which is hereby incorporated by reference herein as if fully set forth.

FIELD OF INVENTION

This disclosure relates to camera flashes that incorporate light emitting diodes (LEDs) and, in particular, to a ring-shaped camera flash that surrounds the lens of a camera.

BACKGROUND

Cameras are prevalent in smartphones and other electronic devices that are relatively compact. The flash for the camera is typically formed of one or two phosphor-converted, white-light light emitting diodes ("LEDs"). The total combined area of the LEDs typically determines the instantaneous brightness of the flash for a given driving current pulse. The bare LED die is GaN-based and emits blue light, and the phosphor (typically YAG) adds a yellow component (or red and green components). The combination of the blue light leaking through the phosphor and the light provided by the phosphor itself creates the bright white light for the flash.

The camera flash typically uses a tiny Fresnel lens or other type of molded plastic lens to collimate the light in an attempt to direct most of the light at the subject in the field of view of the camera. The flash lenses are typically small, and the LED is off to one side of the camera lens. Due to the difficulties in designing small flash units, the lighting quality produced by LED flash units is typically low. Improvements in LED flashes for small cameras are needed.

SUMMARY

In one embodiment, a white-light LED is mounted near an end of a Metal Core Printed Circuit Board (MCPCB) in an LED assembly. Two such LED assemblies are molded into a ring-shaped light guide, the LED assemblies being 180 degrees apart within the light guide. Since the light guide material (e.g., transparent acrylic, poly(methyl methacrylate) ("PMMA"), etc.) directly encapsulates the LEDs and MCPCB, there is very good optical coupling of the LEDs to the light guide material. A small camera lens of a smartphone is positioned in or behind a center opening of the light guide. The top surface of the light guide has optical features for extracting the injected light, such as a roughened surface, prisms, and the like.

The light emitted from the two LEDs is reflected off the smooth side and bottom surfaces of the light guide by total internal reflection ("TIR") until the light impinges on the top surface of the light guide, where the light exits. Light from one LED assembly that reaches the reflective surface of the opposite LED assembly is diffusively reflected back within the light guide. The optical features on the surface of the light guide may be tailored to uniformly leak out the light. In various embodiments, the LEDs are top-emitting LEDs or are side-emitting LEDs. The portions of the MCPCBs that protrude out from the light guide act as air-cooled heat sinks.

Heat sinking is important where the LED is steadily turned on, such as for video or being used as a flash light.

Benefits of the disclosed LED light guide include production of a desired light emission profile, where light is symmetrically emitted around the camera lens, has a peak emission axially aligned with the camera lens, and rolls off toward the edges of the camera's field of view.

Additional features and embodiments are described herein.

BRIEF DESCRIPTION OF THE DRAWING(S)

Elements that are the same or similar are labeled with the same numeral.

DETAILED DESCRIPTION OF THE PREFERRED EMBODIMENT(S)

Figure 1:
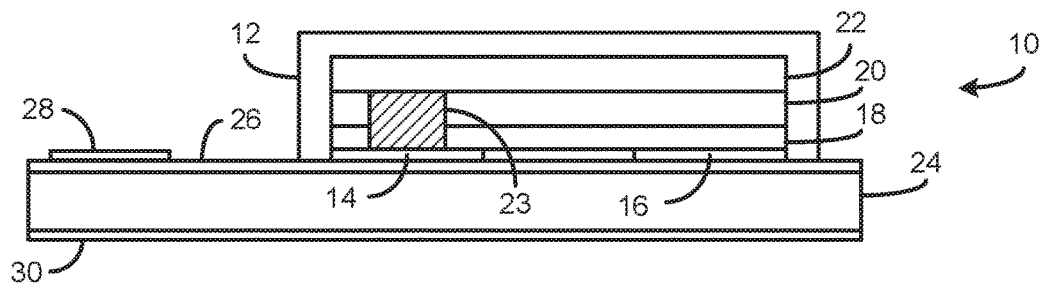
FIG. 1 is a cross-sectional view of a top-emitting LED mounted on a PCB, in accordance with one example.

FIG. 1 illustrates an LED 10. On example of a commercially available LED for use as LED 10 is the model LXCL-PWF4 flash module sold by Lumileds Holdings, B.V. The LED 10 comprises a blue-emitting GaN-based die coated with a YAG phosphor layer 12. The blue light and yellow light create white light suitable for photography. The LED die comprises a cathode metal contact 14, an anode metal contact 16, a P-type semiconductor layer 18, an active layer 20 (a quantum well), an N-type semiconductor layer 22, and a metal via 23 extending up to the N-type semiconductor layer 22 to form an electrical connection between the cathode metal contact 14 and the N-type semiconductor layer 22.

The LED 10 is mounted on a printed circuit board ("PCB") such as a metal core printed circuit board ("MCPCB") 24 having an insulating layer 26 and a metal pattern 28 for connecting a flash power supply to the contacts 14/16. The MCPCB 24 has a white (diffusively reflective) back surface formed by a reflective layer 30 that, in some embodiments, comprises white diffusing particles, such as TiO2. The front surface of the MCPCB 24 (opposite the back reflective surface 30) may also be coated with the reflective layer. In one embodiment, the LED 10 is about 1 mm wide or less, and the MCPCB 24 is about 1-2 mm wide so that the portion of the MCPCB 24 supporting the LED 10 can be encapsulated in a thin, acrylic ring-shaped light guide. The LED 10 is "top-emitting" because light is emitted out of the top of the LED 10 (in the "up" direction in FIG. 1).

Figure 2:
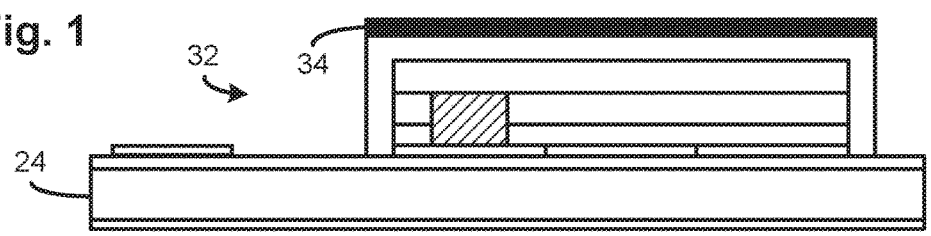
FIG. 2 is a cross-sectional view of a side-emitting LED mounted on a PCB, in accordance with another example.

FIG. 2 illustrates a side-emitting white light LED 32 on the MCPCB 24, where the LED 32 is identical to that of FIG. 1 but with a reflective layer 34 (e.g., silver) so that all light is emitted from the sides of the LED 32. The reflective layer 34 may also be a side-emitting lens.

Figure 3:
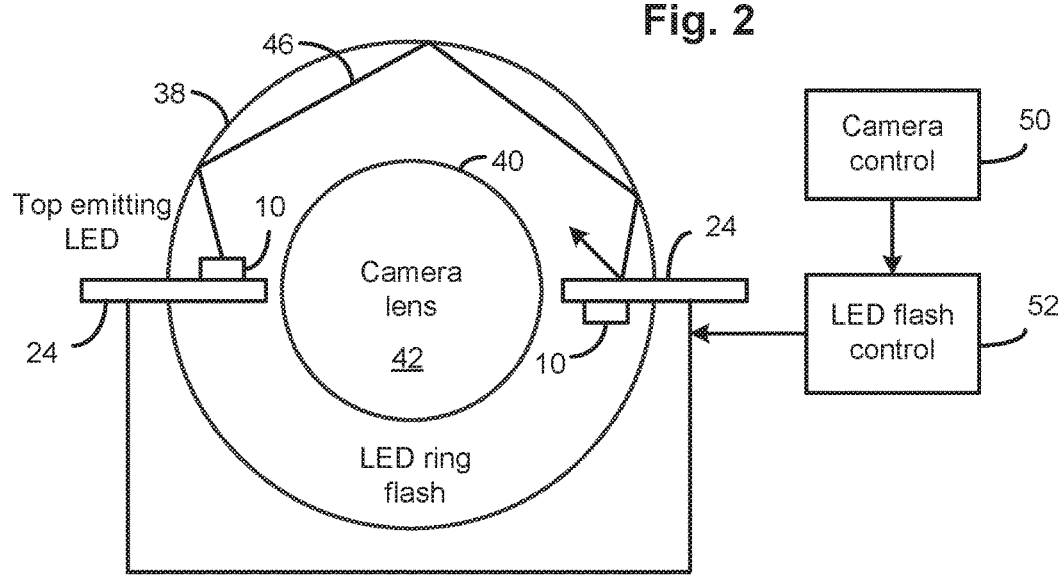
FIG. 3 is a front view of a flash module, using the front-emitting LEDs of FIG. 1, with a camera lens positioned in or behind the opening in the ring-shaped light guide, in accordance with one example.

FIG. 3 is a top down view of a ring-shaped light guide 38 having a central opening 40 for a camera lens 42. A typical camera lens for a smartphone, including its plastic support member is about 3-7 mm in diameter. Therefore, the opening 40 may be about 3-7 mm in diameter. The outer diameter of the light guide 38 may be 5-15 mm.

Two of the front-emitting LEDs 10 from FIG. 1 are molded into the transparent light guide 38 to encapsulate the LED 10 and optically couple the light into the light guide 38. The index of refraction of the acrylic material forming the light guide 38 may be selected to optimize the optical coupling. The thickness of the light guide 38 may be slightly greater than the width of the LED 10.

One end of the MCPCB 24 extends out from the light guide 38, and its contact pads are electrically connected to an LED flash controller 52 on another circuit board, forming part of the flash module. The LED flash controller 52 is configured to control the LED 10 brightness and illumination time in for various uses such as when generating a brief pulse for use as a camera flash or for a longer duration when used, for example, as a flashlight. The ends of the MCPCBs 24 that extend beyond the light guide 38 also sink heat away from the LEDs 10.

As shown in FIG. 3, a light ray 46 from one of the LEDs 10 internally reflects off the walls of the light guide 38, by total internal reflection, and reflects off the white back surface of the other MCPCB 24 until the light ray impinges on the top surface of the light guide 38 and exits the light guide 38. The top surface is roughened or has other optical features which cause the light to leak out of the top surface to create a fairly uniform emission. Although two LEDs are shown, there may be more molded into the light guide 38 for added luminous flux. The white back surfaces of each MCPCB 24 diffusively reflect light to increase the chances of light rays impinging on the top surface of the light guide 38.

Also shown in FIG. 3 is the camera control circuitry 50, which controls the LED flash controller 52 to provide a current pulse to the contact pads on the MCPCBs 24 for energizing the LEDs 10 while a camera picture is being taken. In one example, the camera control circuitry 50 determines that a subject pointed at by the camera lens 42 is insufficiently illuminated and in response controls the LED flash controller 52 to energize the LED 10.

Figure 4:
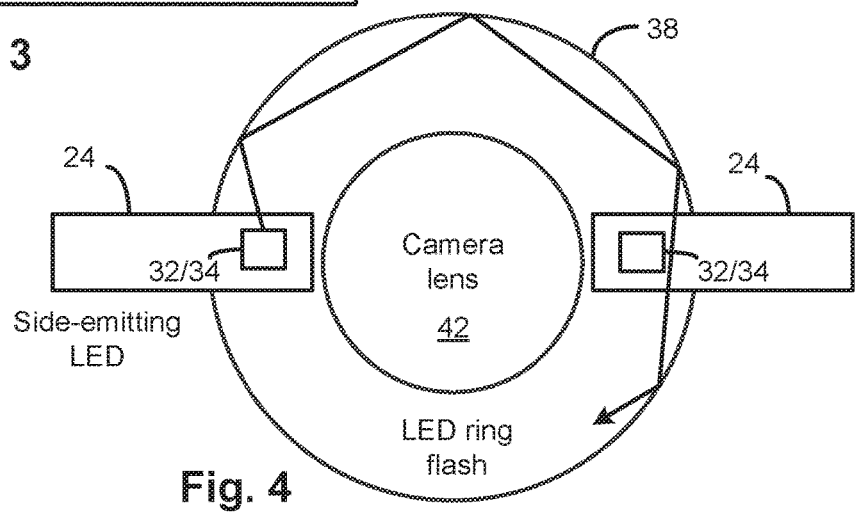
FIG. 4 is a front view of a flash module, using the side-emitting LEDs of FIG. 2, with a camera lens positioned in or behind the opening in the ring-shaped light guide, in accordance with another example.

FIG. 4 is a top down view of the light guide 38 encapsulating the side-emitting LED 32 of FIG. 2, where the top surface of the MCPCB 24 is parallel to the light emission surface of the light guide 38. Using the side-emission LED 32 reduces visible "hot spots" above the LED 32 and creates a more uniform emission. The ends of the MCPCBs 24 that extend out of the light guide 38 have their contact pads electrically connected to the LED flash controller 52 illustrated in FIG. 3.

The light guide 38 may be 1-3 mm thick to encapsulate the LED and MCPCB and sufficiently mix the light. A larger light guide 38 improves light emission uniformity around the ring. Since the height of a side emitting LED may be less than the width of the MCPCB, the thickness of the light guide 38 in FIG. 4 may be less than the thickness of the light guide 38 in FIG. 3.

Figure 5:
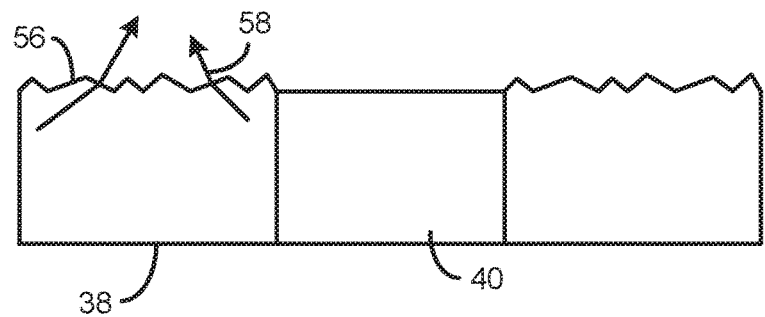
FIG. 5 is a cross-sectional view of the ring-shape light guide showing a patterned light exit surface for allowing light to leak out to achieve a desired light emission profile, according to an example.

FIG. 5 is a cross-section of the light guide 38, greatly exaggerating the light extraction features 56 on the top surface for leaking light, according to an example. The light extraction features 56 may include surface roughening of the surface of the light guide 38 and/or may include molded prisms extending from the surface of the light guide 38. Since the flux within the light guide is generally the greatest near the LED and near the back white surface of the MCPCB reflecting light, the light extraction features 56 may be tailored to extract a higher percentage of the light half way between the location of one LED and the MCPCB supporting the other LED. In some examples, different light extraction features at different locations on the surface of the light guide 38 vary in shape, size, and/or configuration to extract different amounts of light emitted from the LEDs, in different directions, in order to provide a substantially uniform appearance of light. Two light rays 58 are shown being redirected by the light extraction features 56 to exit the top surface of the light guide 38.

Figure 6:
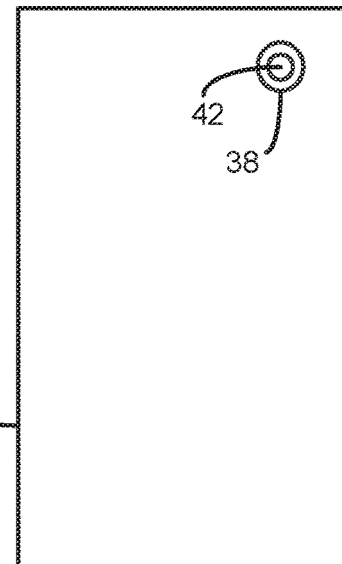
FIG. 6 illustrates the back of a smartphone showing the flash module and the camera lens in the opening of the flash module, according to an example.

FIG. 6 illustrates the back of a conventional smartphone 60 using the present ring-shaped flash, where the light guide 38 and camera lens 42 are shown. Although illustrated in a smart phone, the ring-shaped flash may be used with cameras other than those in smartphones. Any electronic device incorporating a camera could use the flash system of the present disclosure. Such electronic device includes or is coupled to a power source, includes electrical couplings between the power source and the camera, and includes other electrical components such as processing components, storage or memory, or the like. The electronic device also includes a housing or enclosure in which the components of the electronic device are disposed. The flash, a camera, and the camera lens are arranged to protrude from the housing so that the camera is able to obtain an image of a subject illuminated by the flash.

Besides the functional advantage of the ring-shaped flash, the unaesthetic yellow phosphor typically present in white color LEDs is less visible since the LEDs are mounted sideways in the light guide 38 (FIG. 3) or the phosphor is hidden by the reflector layer 34 (FIG. 4). The ring-shaped flash produces a more diffused light than a conventional "point source" LED flash, and there are no point source reflections from a human subject's eyes. The molded flash module is simple to manufacture and does not require the separate manufacturing step of encapsulating an LED in a flash lens. The round flash creates a symmetrical circular light emission that is similar to the field of view of the camera. Since there is no flash lens, which would require a specific gap between the LED and the lens, the manufacturing tolerances for the inventive flash module are relaxed as compared with a configuration that includes both a flash and a flash lens.

Figure 7:
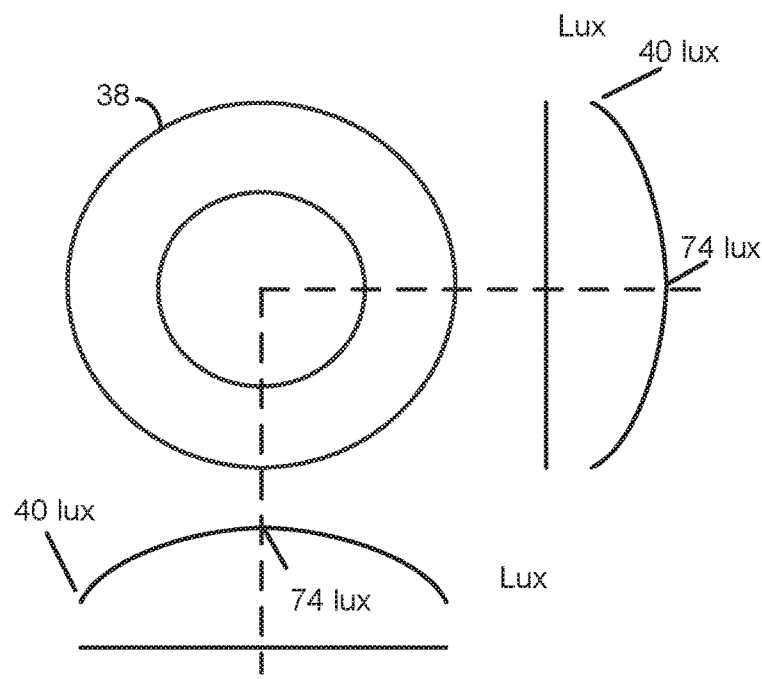
FIG. 7 illustrates an example light emission profile of the flash module at the focal length of the camera lens, showing a peak emission axially aligned with the camera lens and a symmetrical roll off to the edges of the camera's field of view.

FIG. 7 depicts simulated results of the flash, where the total flux is 360 lux. The measurement is taken at the focal length of the camera lens, which may be about 10 mm, depending on the model of smartphone. As shown, the light emission profiles are substantially symmetrical horizontally and vertically, with the peak flux being 74 lux at the center, rolling off to about 40 lux at the edge of the camera's field of view, which makes the flash useful for a smartphone camera where the subject is usually in the center of the frame. The diagonal uniformity is greater than 40% for a field of view of 75 degrees, but can be improved with the tailoring of the light extraction features 56 (FIG. 5).

While particular embodiments have been shown and described, it will be obvious to those skilled in the art that changes and modifications may be made without departing from this disclosure in its broader aspects and, therefore, the appended claims are to encompass within their scope all such changes and modifications as fall within the true spirit and scope of this disclosure.

What is claimed is:

1. An illumination system, comprising:
a light guide that includes an opening;
a camera lens positioned to collect light through the opening of the light guide; and
a first light emitting diode (LED) encapsulated in the light guide and configured to emit light into the light guide, the light guide including a light extraction feature configured to direct at least a portion of the emitted light out of the light guide.

2. The illumination system of claim 1, wherein the light guide is formed from a light guide material that encapsulates the first LED, the light guide material having a refractive index selected to couple the emitted light into the light guide.

3. The illumination system of claim 2, wherein the light guide encapsulates the first LED such that light emitted from the first LED enters the light guide material without passing through a gaseous medium and without passing through a vacuum.

4. The illumination system of claim 2, wherein the light guide material is a moldable acrylic material.

5. The illumination system of claim 1, wherein the light extraction feature is positioned on a surface of the light guide.

6. The illumination system of claim 1, wherein the light extraction feature includes a roughened portion of an output surface of the light guide, the output surface facing an output direction, the output direction being substantially orthogonal to a plane of the light guide.

7. The illumination system of claim 1, wherein the light extraction feature includes a prism positioned on an output surface of the light guide, the output surface facing an output direction, the output direction being substantially orthogonal to a plane of the light guide.

8. The illumination system of claim 1, further comprising a second LED encapsulated in the light guide and configured to emit light into the light guide, the first LED and the second LED being positioned on substantially diametrically opposite sides of the light guide.

9. An illumination system, comprising:
a light guide configured to guide light along a closed path loop, the light guide being shaped to guide light in a first direction around the light guide;
a first light emitting diode (LED) encapsulated in the light guide and configured to emit light into the light guide in the first direction around the light guide; and
a second LED encapsulated in the light guide and configured to emit light into the light guide in the first direction around the light guide, the first LED and the second LED being positioned on substantially diametrically opposite sides of the light guide,
the light guide including a light extraction feature configured to direct at least a portion of the emitted light out of the light guide.

10. The illumination system of claim 9, wherein the first LED and the second LED are top-emitting LEDs.

11. The illumination system of claim 10, wherein:
the first LED is mounted on a front of a first printed circuit board, the first printed circuit board having a diffusively reflective back surface; and
the second LED is mounted on a front of a second printed circuit board, the second printed circuit board having a diffusively reflective back surface.

12. The illumination system of claim 9, wherein the first LED and the second LED are side-emitting LEDs.

13. The illumination system of claim 9, further comprising circuitry configured to power the first LED.

14. The illumination system of claim 1, further comprising a smart phone, the smart phone including a camera, the camera including the camera lens, the light guide being configured as a flash for the camera.

15. A method for providing illumination, the method comprising:
emitting light from a first light-emitting diode (LED) into a light guide, the first LED being encapsulated in the light guide, the light guide being configured to guide light along a closed path loop, the light guide being shaped to guide light in a first direction around the light guide, the first LED being oriented to emit light in the first direction;
emitting light from a second LED into the light guide, the second LED being encapsulated in the light guide, the second LED being oriented to emit light in the first direction; and
extracting, with a light extraction feature positioned on the light guide, at least a portion of the emitted light out of the light guide.

16. The method of claim 15,
wherein the first LED is a top-emitting LED that is mounted on a front of a first printed circuit board, the first printed circuit board having a diffusively reflective back surface;
wherein the second LED is a top-emitting LED that is mounted on a front of a second printed circuit board, the second printed circuit board having a diffusively reflective back surface; and
further comprising reflecting at least a portion of light in the light guide with the diffusively reflective back surfaces of the first printed circuit board and the second printed circuit board.

17. An illumination system, comprising:
a light guide configured to guide light along a closed path loop, the light guide shaped to guide light in a first direction in the light guide;
a first light-emitting diode (LED) encapsulated in the light guide and configured to emit light into the light guide in the first direction; and
a second LED encapsulated in the light guide and configured to emit light into the light guide in the first direction,
the light guide including a light extraction feature configured to direct at least a portion of the emitted light out of the light guide.

18. The illumination system of claim 17, wherein:
the first LED and the second LED are top-emitting LEDs;
the first LED is mounted on a front of a first printed circuit board, the first printed circuit board having a diffusively reflective back surface; and
the second LED is mounted on a front of a second printed circuit board, the second printed circuit board having a diffusively reflective back surface.

* * * * *